United States Patent
Bose et al.

(10) Patent No.: US 7,487,012 B2
(45) Date of Patent: Feb. 3, 2009

(54) METHODS FOR THERMAL MANAGEMENT OF THREE-DIMENSIONAL INTEGRATED CIRCUITS

(75) Inventors: Pradip Bose, Yorktown Heights, NY (US); Alper Buyuktosunoglu, White Plains, NY (US); Eren Kursun, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 11/747,279

(22) Filed: May 11, 2007

(65) Prior Publication Data

US 2008/0281476 A1  Nov. 13, 2008

(51) Int. Cl.
   *G05D 23/00* (2006.01)
(52) U.S. Cl. .................................... 700/300
(58) Field of Classification Search .................. 700/300
   See application file for complete search history.

(56) References Cited

U.S. PATENT DOCUMENTS

| | | | |
|---|---|---|---|
| 5,502,838 A | 3/1996 | Kikinis et al. | |
| 7,050,959 B1 | 5/2006 | Pollard, II et al. | |
| 7,091,604 B2 | 8/2006 | Wylie et al. | |
| 2001/0033030 A1* | 10/2001 | Leedy | 257/777 |
| 2007/0244676 A1* | 10/2007 | Shang et al. | 703/2 |

OTHER PUBLICATIONS

Mondal et al. "Thermally Robust Clocking Schemes for 3D Integrated Circuits" in Design, Automation & Test in Europe Conference & Exhibition, Apr. 2007 pp. 1-6.*

David Brooks, et al.; "Dynamic Thermal Management for High-Performance Microprocessors"; International Symposium on High-Performance Computer Architecture; Jan. 2001.

"Power Management"; Wikipedia.org—Wikipedia Encyclopedia; Mar. 13, 2007.

Multi-core (computing); Wikipedia.org—Wikipedia Encyclopedia, Mar. 13, 2007.

A.W. Topol, et al., "Three-Dimensional Integrated Circuits", IBM Journal of Research and Development, vol. 50, No. 4/5, pp. 491, 506; 2006.

Yuan Xie, et al. "Design Space Exploration for #D Architectures" AMC Journal on Emerging Technologies in Computing Systems, vol. 2, No. 2, Apr. 2006, pp. 65-103.

Bryan Black, et al. "Die Stacking (3D) Microarchitecture", in Proceedings of The 39th Annual IEEE / ACM International SYmposium on Microarchitecture, Dec. 9-13, 2006, Orlando, Florida, USA.

(Continued)

*Primary Examiner*—Albert DeCady
*Assistant Examiner*—Steven R Garland
(74) *Attorney, Agent, or Firm*—Cantor Colburn LLP; Lisa Yamonaco

(57) ABSTRACT

A method of dynamic thermal management in a multi-dimensional integrated circuit or device is provided. The method includes monitoring on-chip temperatures, power dissipation, and performance of device layers. The method includes comparing on-chip temperatures to thermal thresholds, on-chip power dissipation to power thresholds and on-chip performance to performance thresholds. Also, the method includes analyzing interactions between temperatures, power, and performance of different device layers within the multi-dimensional integrated circuits. The method includes activating layer-specific thermal and power management within performance constraints on one or more device layers through actuators in the corresponding device layers, depending on the severity of heating.

6 Claims, 5 Drawing Sheets

OTHER PUBLICATIONS

J. Burns, et al., "Three-Dimensional Integration Circuits for Low-Power, High-Bandwidth Systems on a Chip" IEEE International Solid-State Circuits Conference, Feb. 2001.

Kaustav Banerjee, et al. 3-D ICs: A Novel Chip Design for Improving Deep-Submicrometer Interconnect Performance and System-on-Chip Integration, May 2001.

Jiang, H., et al.; "Benefits and Costs of Power-Gating Technique", ICCD Proceedings of the 2005 International Conference on Computer Design; pp. 559-566; Year of Publication 2005; IEEE Computer Society Washington DC USA; retrieved via internet: http://portal.acm.org/citation.cfm?id=1097113.1097595 on Aug. 19, 2008.

* cited by examiner

METHODS FOR THERMAL MANAGEMENT OF THREE-DIMENSIONAL INTEGRATED CIRCUITS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

This invention relates to dynamic thermal management, and particularly to dynamic thermal management in multi-dimensional integrated circuits or devices.

Three-dimensional (3D) integrated circuits (ICs) display clear advantages over their two-dimensional (2D) counterparts in terms of interconnect length, signal delay, packaging density, and noise immunity. However, their thermal characteristics are considered to be challenging. Recent research shows that multi-layer (or 3D) integrated circuits cause increased chip temperatures, yet the corresponding heating is within manageable limits. In general, thermal problems in 3D integration can be summarized as:

(i) Elevated lower density due to reduced footprint and surface area;

(ii) Increased distances from device layers to heat sink and heat spreader; and (iii) Isolation of device layers through poor heat conductors (such as dielectrics, bonding materials, and alike).

In the past years, as the ultra-large scale integration (ULSI) design became increasingly interconnect limited, three-dimensional integrated circuits gained significant interest. However, thermal management techniques specifically targeting three-dimensional integrated circuits need to be designed for these structures. Currently, there are no adequate techniques that exist for three-dimensional integrated circuits. Traditional temperature management techniques targeting the planar (two-dimensional) design philosophy are not capable of handling issues specific to the multi-layer characteristics of 3D ICs, such as, variation in distances to the heat sink and thermal interaction between device layers.

Therefore, it is desired to have techniques for temperature management in multi-dimensional integrated circuits or devices.

SUMMARY

In accordance with exemplary embodiments, a method of dynamic thermal management in a multi-dimensional integrated circuit and/or device is provided. The method includes monitoring on-chip temperatures, on-chip power dissipation, and on-chip performance of device layers, and comparing on-chip temperatures to thermal thresholds, on-chip power dissipation to power thresholds, and on-chip performance to performance thresholds. The method also includes analyzing interactions between temperatures of different device layers, power of different device layers, and performance of different device layers within the multi-dimensional integrated circuit, and activating layer-specific thermal and power management within performance constraints on one or more device layers through actuators in the corresponding device layers, depending on the severity of heating.

Additional features and advantages are realized through the techniques of the present disclosure. For a better understanding of the advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages are apparent from the following detailed description taken in conjunction with the accompanying drawings in which:

Figure 1A:
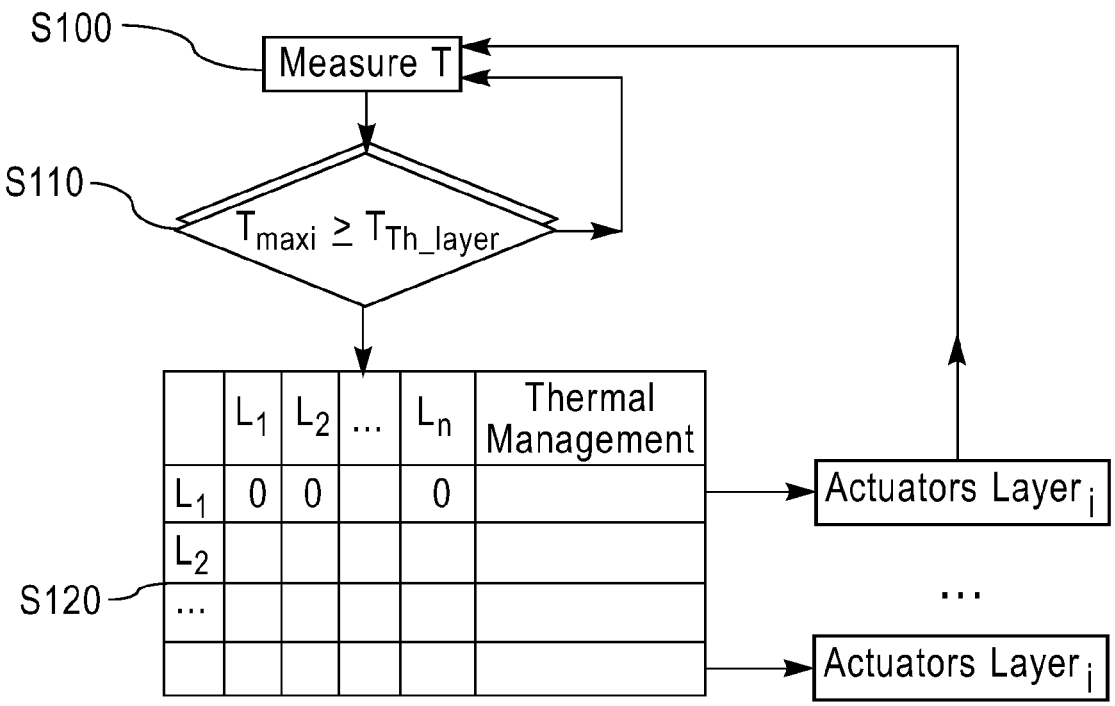
FIG. 1A illustrates a non-limiting example of thermal management in a three-dimensional integrated circuit and/or device utilizing a layer based hierarchical temperature management scheme.

The detailed description explains exemplary embodiments, together with advantages and features, by way of example with reference to the drawings.

DETAILED DESCRIPTION OF EXEMPLARY EMBODIMENTS

Exemplary embodiments are presented which specifically target thermal management of multi-dimensional (3D) integrated circuits (ICs) and/or multi-layered devices. Techniques are presented that utilize the interaction between temperatures of different device layers and leverage this inter-layer temperature interaction to alleviate the existing heating problems within three-dimensional ICs and/or devices. The temperatures are managed at device layer granularity in addition to the traditional chip and unit level granularities. High performance microprocessor architectures benefit from thermal management due to their size, power, and thermal characteristics in a three-dimensional implementation.

Distinctions Between Two-Dimensional and Three-Dimensional Integrated Circuits (1) Variation in Temperatures: In planar (2D) circuits, device heating occurs mainly due to self-heating and lateral heat dissipation from neighbor blocks (which are blocks that are in lateral proximity to one another). In three-dimensional integrated circuits, heating is strongly correlated to the placement of the device layer in a multiple-layer stack. For instance, given a 3D integrated circuit with identical device layers and equal power dissipation, temperature differs significantly depending on the proximity to the heat sink and/or heated device layers. Heterogeneous integration of various materials and technologies on the same chip (such as Si, SiGe, logic, memory, etc.) accentuate the temperature differences between device layers even further.

(2) Need for Layer-Specific Dynamic Thermal Management Techniques (DTMs); As a result of the material, functionality variation, and technology variation, device heating is considerably different for individual layers of a multi-layer 3D integrated circuit. In addition, the effects of similar heating patterns are considerably different. For instance, the same amount of heating may result in drastic changes in analog or radio frequency (RF) circuitry as compared to static complementary metal oxide semiconductor (CMOS). Therefore, different thermal management characteristics for individual device layers are needed, which may include varied temperature thresholds, varied response times, and varied temperature reduction ranges (i.e., thermal swings).

For effective thermal management, it is important to manage the thermal problems at the granularity at which they occur. Layer-specific (or layer-based) thermal management (discussed herein) results in reduced performance overhead and improved efficiency as compared to local and chip level management. In a multi-layer processor environment, global thermal management techniques penalize the entire circuit performance. On the other hand, localized techniques such as block/core level management may not provide sufficient thermal alleviation depending on the range of heating.

Voltage and frequency scaling at finer granularity, such as block or core level, yield complications in terms of L(di/dt) (the change in inductance over time), voltage drop in supply networks and related noise issues, increased response time, and metastability. Separate clock and supply voltage distribution network infrastructure already exist in a three-dimensional design. Thus, techniques discussed herein provide ways to utilize the existing infrastructure and physical separation of device layers in layer-based thermal management.

(3) Need for Utilizing the Thermal Interactions between Layers: As the device layers are organized in a multi-dimensional stack, the temperature of a particular device layer is affected by the temperature of the device layers in close proximity to it, such as top and bottom neighbors. Hence, in order to reduce the temperature of a layer, techniques are provided that utilize these neighboring layers in actions, such as assisting in the heat removal of the heated layer, clearing the heat removal path, etc.

Also, described herein are layer-based techniques for the thermal management of three-dimensional integrated circuits, which utilize the localized variation in terms of heat dissipation and removal, as well as the effectiveness of heat propagation between regions in a multi-layer 3D IC. Thermal management may include any of the following: utilizing specialized temperature management at layer granularity specific to the characteristics of the device layer; utilizing the interaction between device layers by employing complementary heating patterns in neighboring layers; utilizing the variation in heat removal efficiency at different locations of the chip by dynamically adjusting the scope of thermal management depending on the severity of heating; and improving the heat removal efficiency by iteratively removing hotspots that interfere with the proper heat flow.

METHOD 1

Layer Specific Dynamic Thermal Management (DTM)

In a three-dimensional integrated circuit, physical separation of functionality into multiple layers may be accompanied with separate clock and supply voltage distribution networks. As a result of this, each layer is capable of specialized dynamic thermal management that targets the characteristics of the device layer. The herein disclosed layer-specific thermal management may be accompanied with chip-wide and local (such as core level) management.

Characteristics of DTM for each layer differ in terms of: (1) number and placement of on-chip temperature sensors; (2) temperature monitoring intervals (as the time constants vary for disparate materials and/or technologies); (3) temperature management processes, such as complexity, running time, and dedicated hardware for thermal management; (4) set of temperature management actuators (based on their response time characteristics and temperature swing); and (5) level of hierarchy within the layer-specific (layer-based) management (for example, if a layer has multiple processor cores, core-level management hierarchy may be necessary).

Each layer has a specialized hierarchy, depending on the preliminary thermal analysis at the design stage. Even identical layers are likely to have considerably different thermal management due to the difference in their placement in the multi-layer stack.

If the thermal emergencies (which occur when on-chip temperatures are above preset thresholds) are lower than predetermined thermal thresholds and area thresholds, layer-specific techniques are used for the temperature management. If the heating persist or expands, inter-layer thermal management (discussed herein) needs to be activated.

FIG. 1A illustrates a non-limiting example of thermal management in a three-dimensional integrated circuit and/or device utilizing a layer-specific (layer-based) hierarchical temperature management scheme. On-chip temperature monitoring gets activated (S100), and maximum on-chip temperatures are compared to thermal thresholds and the severity of heating is determined (S110). A global thermal management operation (indicated by the multi-dimensional chart in FIG. 1A) then analyzes the interactions between the temperatures of different device layers (S120). Operation S120 activates layer-specific thermal management on one or more device layers depending on the severity of heating, through the actuators in the corresponding device layers. The utilization of actuators can range from power gating the device layer to dynamic voltage or frequency sealing. Furthermore, thermal management actuators refer to capabilities such as reducing the supply voltage or frequency, shutting down the supply voltage or clock signal to part or all of the chip (or device layers), throttling some parts of the available resources—and similar techniques, in order to reduce the on-chip temperatures. In many cases, a trade off is made between performance with reduced/enhanced power dissipation and on-chip temperatures.

Figure 1B:
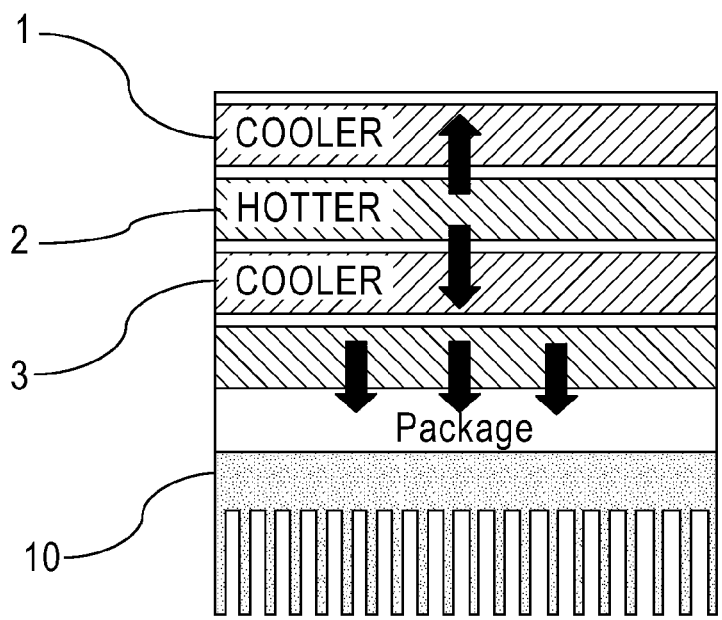
FIG. 1B illustrates a non-limiting example of a three-dimensional integrated circuit with heterogeneous integration.

FIG. 1B illustrates a non-limiting example of a three-dimensional integrated circuit with heterogeneous integration. In this exemplary embodiment, each layer (1, 2, 3, etc.) has separate power distributing grids, as well as separate clock distribution trees. Since layer 1 is the top layer, it likely has nothing obstructing the release of heat at the top of layer 1, with immediate access to the heat spreader, heat sink or any other cooling solution.

Layer 2, e.g., an analog device layer, is not immediately neighboring specialized cooling or heat spreader/sink 10, and layer 2 has a higher temperature than either layers 1 or 3. One reason is because the heat from both layers 1 and 3 affects layer 2. Thus, an increased number of thermal sensors along with dynamic thermal management techniques with shorter response time and higher temperature swing are used for layer 2. Also, a dedicated hardware block for thermal management may be needed. Within this context, multiple thermal management actuators with varying temperature/performance trade-offs may be incorporated. Further, layer 2 may include additional sensors to monitor the thermally critical areas. Dynamic voltage and frequency scaling infrastructure may be incorporated only at selected layers, such as layer 2.

Layer 3, e.g., a memory layer, is within close proximity to the heat spreader/sink 10, and heat is transferred away from layer 3 more quickly than layer 2. Therefore, if desired, purely architectural management techniques may be sufficient for layer 3.

METHOD 2

Inverse Heating

In a three-dimensional design, vertical distances between immediate device layers are significantly smaller than lateral distances. Further enhancement of the vertical heat flow is possible through structures such as thermal vias, vertical interconnects (Cu-Cu, Tungsten and alike).

Figure 2B:
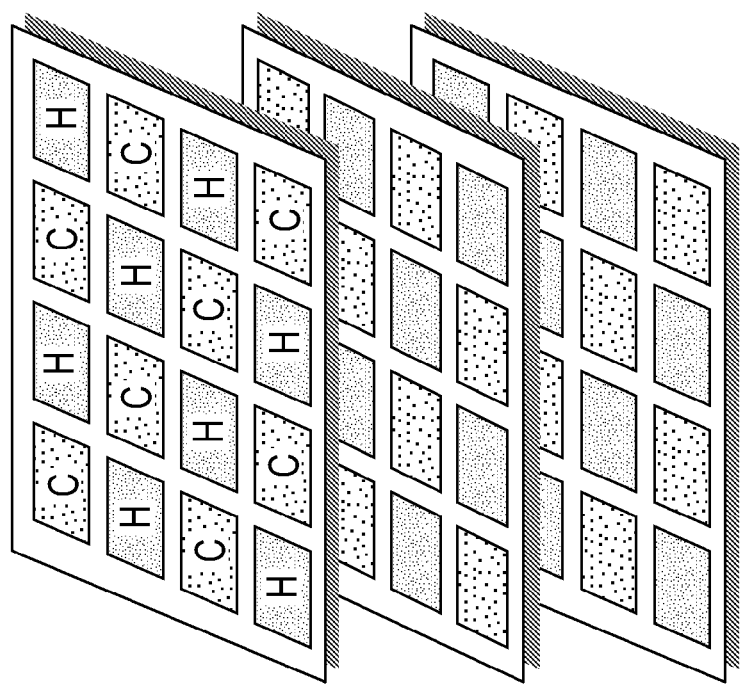
FIG. 2B illustrates a non-limiting example of multiple processor cores in a checkerboard heating/cooling pattern.
Figure 2A:
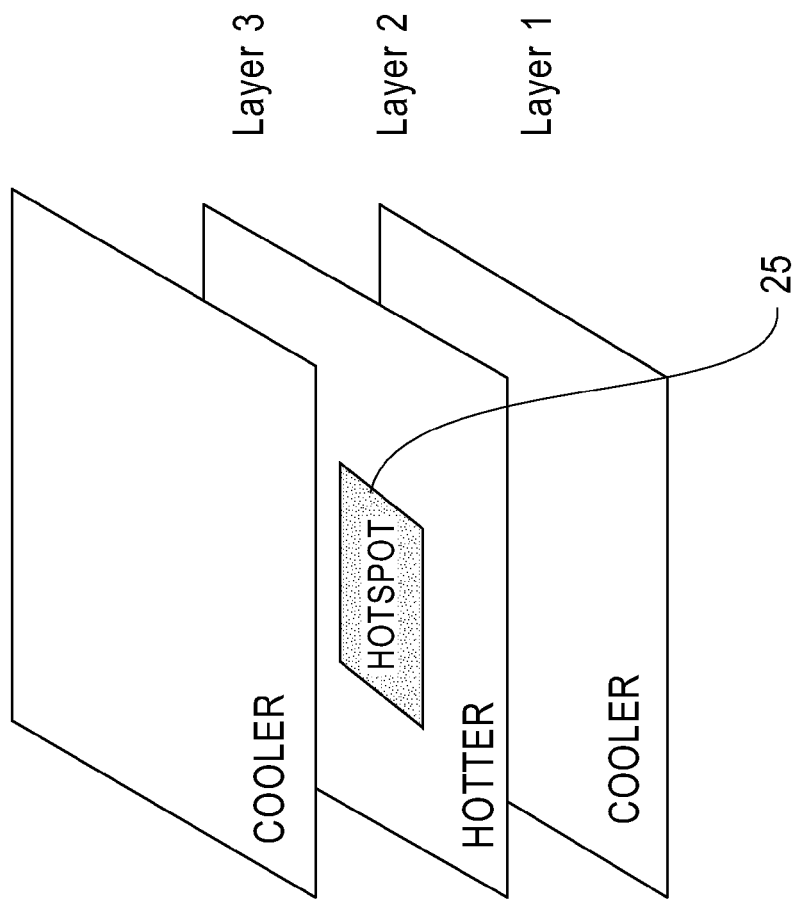
FIG. 2A illustrates a non-limiting example of utilizing complementary heating patterns among device layers in a 3-layer stack to alleviate a hotspot.

In FIGS. 2A and 2B, dynamic thermal management (DTM) techniques exploit the interaction between temperatures of neighboring device layers 1, 2, and 3 through effective coordination. In other words, DTM techniques manage the temperatures of immediate neighboring device layers 1, 2, and 3 in a complementary fashion.

FIG. 2A illustrates a non-limiting example of utilizing complementary heating patterns between device layers (1, 2, and 3) in a 3-layer stack for alleviating a hotspot 25 in layer 2. The DTM techniques are activated if there is heating above preset thresholds. The DTM technique is used to control the heating such that the hotspot 25 of device layer 2 is in immediate contact with cooler parts of the upper layer 1 and lower layer 3. As the temperature sensor(s) monitor and extract the thermal map for each layer 1, 2, and 3, the inverse thermal maps are then used as a target to form the thermal profile of the upper/lower layers 1 and 3. As a non-limiting example, if a hotspot 25 is sensed in the center of layer 2, the heating patterns of layers 1 and 3 are inverted as compared to layer 2, such that cooler regions of layers 1 and 3 correspond to the hotspot of layer 2. Since the hotspot 25 is near the center of layer 2, the coolest region of layers 1 and 3 are correspondingly near the center.

FIG. 2B illustrates a non-limiting example of multiple processor cores on layers 1, 2, and 3 of a three-dimensional integrated circuit with a checkerboard heating pattern. The heating/cooling patterns of the individual cores 20 are reversed on the neighboring layer to minimize the overall temperature and maximize the heat flow from heated regions to cooler regions. In the multi-core example, the resulting thermal map resembles a checkerboard with each hot core H in contact with a cooler core C on top and/or bottom layers. Also, the cooler cores C laterally and vertically separate the hotter cores H from one another.

This DTM design may be applied to a two-dimensional (2D), IC, where each hot core H may be surrounded with cooler cores C in a checkerboard fashion, as shown on layer 1 of FIG. 2B. However, this DTM technique has greater effectiveness in 3D ICs, as the heat propagation in 2D ICs is limited due to two main reasons: (1) limited thermal conductivity of silicon compared to thermal vias, vertical interconnect/metallization and (2) longer distances in lateral heat dissipation from block to block. In addition to the vertical inversion, lateral techniques may also be implemented.

Figure 3:
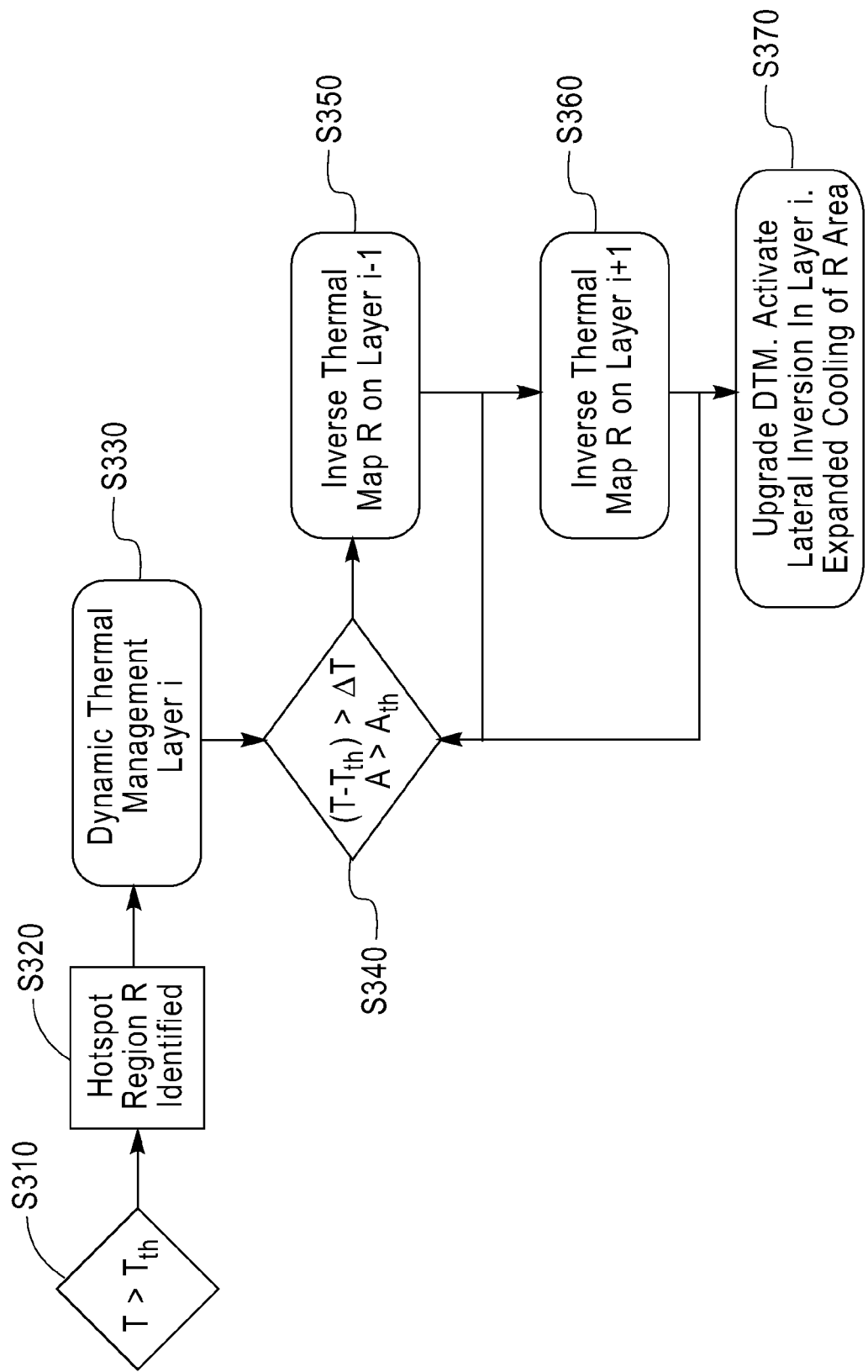
FIG. 3 illustrates a non-limiting example of dynamic thermal management in a three-dimensional integrated circuit and/or device.

FIG. 3 illustrates a non-limiting example of dynamic thermal management in a three-dimensional integrated circuit and/or device. The temperature is monitored, and the temperature is compared with a thermal threshold value $T_{th}$, and if the temperature is above the threshold, the process proceeds to operation S320 (S310). The hotspot region on the chip is identified as region R (S320). Layer-specific dynamic thermal management is activated for layer i (e.g., layer 2 in FIG. 2A) where R resides and continues for N cycles (S330). The severity of the thermal emergency is determined by comparing the temperature above the limit with a threshold $T_{th}$ and by comparing an area of the hotspot R with the limit case of an area threshold $A_{th}$ (S340).

The inverse thermal mapping on layer i−1 (e.g., layer 1) is activated (S350). If inverse thermal mapping on layer i−1 is not sufficient (i.e., the thermal emergency condition is still occurring in S340), the inverse thermal mapping on layer i+1 (e.g., layer 3) is activated (S360). If inverse mapping on layer i+1 is not sufficient (i.e., the thermal emergency condition is still occurring in S340), layer-specific (layer-based) DTM is upgraded to a higher emergency, and lateral inversion within layer i is activated such that the cooling (of hotspot region R) is expanded (S370). Operation S370 may continue to upgrade the layer-specific DTM and compare the temperatures to preset thresholds in operation 340.

During the dynamic thermal management, the order of activation for layer i−1 or i+1 depends on the placement of the cooling system or the heat sink/spreader. For example, the layer closer to the cooling system or heat sink/spreader may be activated first.

An example of severe heating is a case where an intensely utilized 'Integer Execution Unit' heats up above the pre-set threshold. At the early stages, the heating is only local to the region that generates the heat. In the case that the heat removal technique is nonexistent/or ineffective the excessive heat will start spreading laterally and vertically to the neighboring regions (layers), hence increasing their temperatures as well. Eventually this hotspot region may cause a temperature increase over the entire chip causing a severe thermal emergency). Dynamic thermal management addresses this problem as discussed herein.

METHOD 3

Inter-Layer Thermal Management

Figure 4:
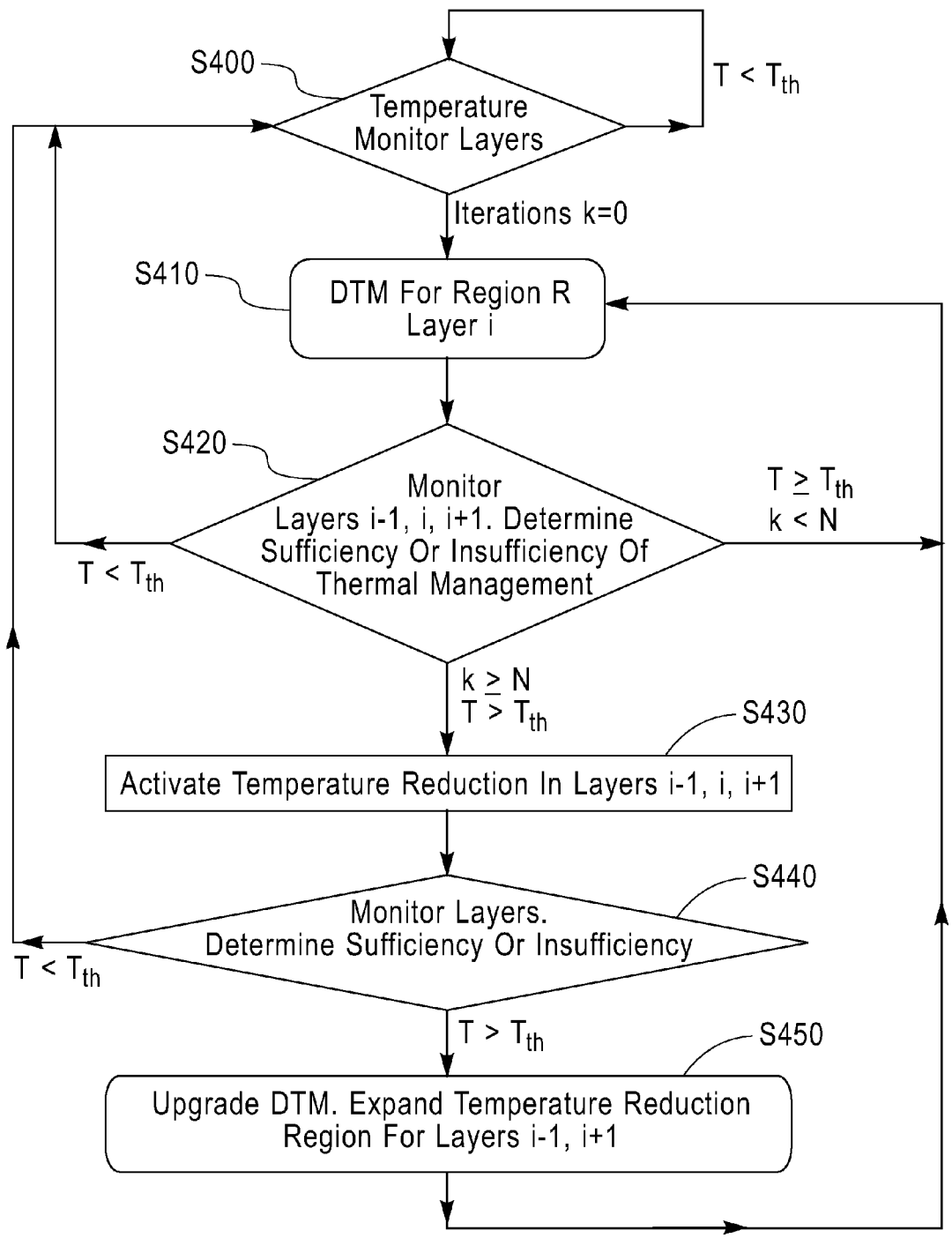
FIG. 4 illustrates a non-limiting example of dynamic thermal management in a three-dimensional integrated circuit and/or device.

FIG 4 illustrates a non-limiting example of dynamic thermal management in a three-dimensional integrated circuit and/or devices. This technique expands the target thermal management region dynamically depending on the characteristics of the hotspot. The on-chip temperatures are monitored, and if temperatures are below preset thresholds, monitoring continues (S400). If temperatures are above the preset thresholds, at the initial stage, layer-specific dynamic thermal management (as set forth in Method 1) is activated for the heated device layer i, the number of iterations k of the DTM process is initially set to k=0, and a region R is identified (S410).

At the end of the thermal monitoring cycle, the process determines whether the layer-specific (layer-based) thermal management is sufficient or insufficient (S420). Sufficiency of the thermal management is determined by the fact that current temperatures are above the preset thermal thresholds, and/or temperature drop is below preset limits. For example, in one technique, the power/temperature management at layers i−1 and i+1 is less aggressive compared to the management within the heated layer i. This can be implemented with power budget reductions for the neighboring layers i−1 and i+1. Thermal management decides on the extent of temperature/power reduction based on chip-level performance criteria. If it is determined that the layer-specific (layer-based)

thermal management is sufficient, the process continues monitoring the temperatures in operation S400.

If the temperatures are above the preset thresholds, but a local DTM iteration (k) has not reached a predetermined number of cycles (N), the process continues operation S410. If the temperatures are above the threshold and the local DTM iteration k is over (or equal to) the predetermined number of cycles N, power/temperature management mechanisms of the neighboring layers i−1 and i+1 are activated (i.e., inter-layer thermal management) (S430).

The temperatures are monitored to determine the sufficiency or insufficiency of the inter-layer thermal management after a preset number of cycles (S440). If the temperatures are below a preset threshold, the process continues monitoring the temperatures in operation S410.

If the temperatures are above the preset threshold, starting with the heating at the original layer, inter-layer thermal management reacts to the thermal problem by extending/expanding the target cooling area and the aggressiveness of the thermal management techniques (such as a voltage drop in dynamic voltage scaling), and at each state, the thermal management scheme of the previous stage is upgraded to a more aggressive scheme (S450). Non-limiting examples for increasing the aggressiveness of the dynamic thermal management may include reducing the supply voltage or clock frequency in bigger steps to larger parts of the chip, throttling the processor resources for extensive durations, etc. Furthermore, milder techniques such as activity migration can also be incorporated at initial stages of design, which are later replaced by more aggressive schemes such as dynamic voltage scaling, global clock gating and the like.

Moreover, extending the aggressiveness may imply one of the following: (1) increasing the drop in voltage/frequency (such as supply voltage being dropped to a half or quarter of the nominal value); (2) incorporating techniques with more temperature reduction (from milder techniques such as activity migration to more aggressive ones such as dynamic voltage scaling); and (3) extending the application area of thermal management (from individual units up to the entire chip).

Furthermore, in the case that heating persists, dynamic thermal management may be extended up to the chip level including all the device layers in the stack.

In this technique, the expansion of DTM is in parallel with the hotspot propagation. As the heating problem persists or extends, the thermal management becomes more preventative by cooling an increased number of neighbor blocks. By reducing the temperature of the vertical neighbors, the heat dissipation from the heated device layer is more effective.

METHOD 4

Path-Based Thermal Management

Figure 5:
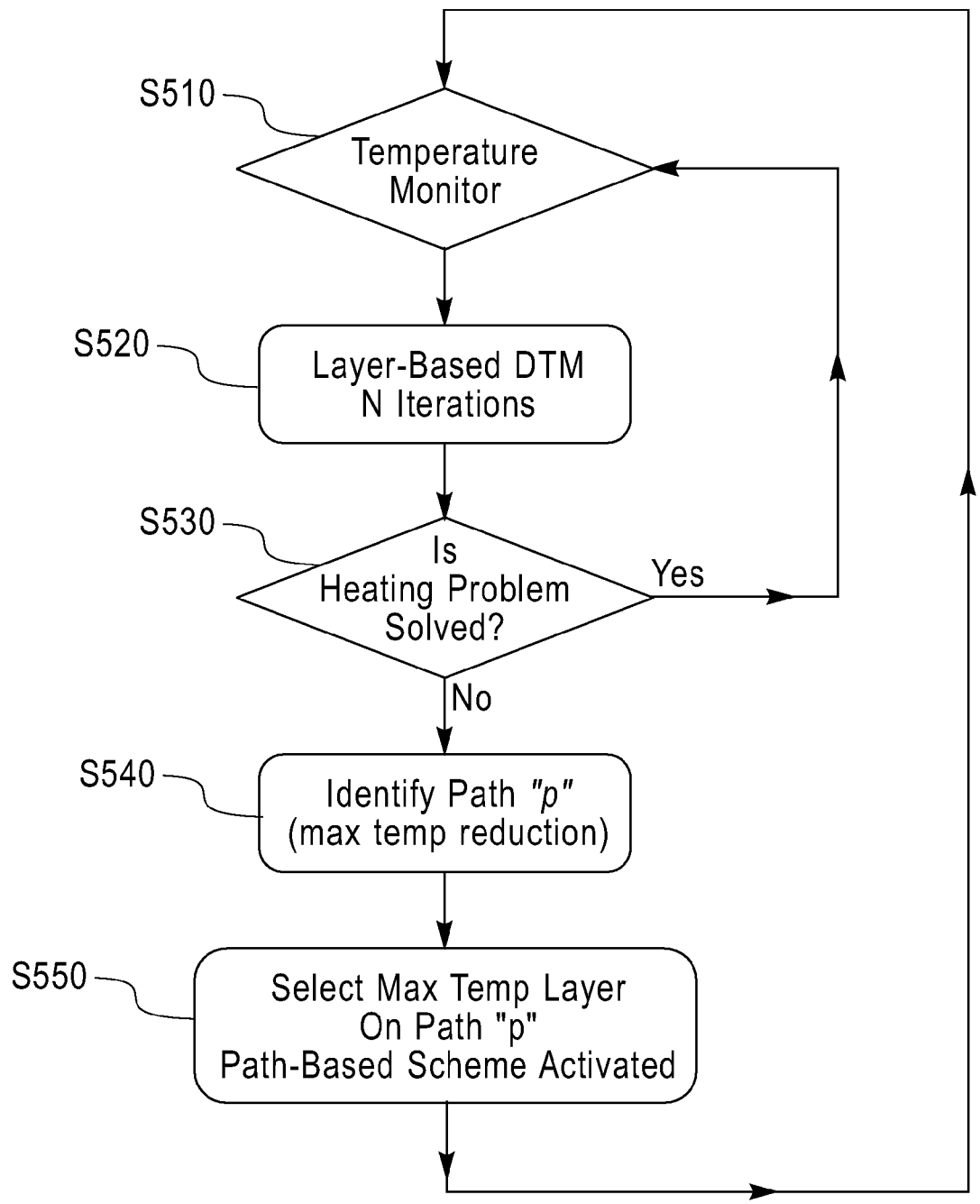
FIG. 5 illustrates a non-limiting example of dynamic thermal management in a three-dimensional integrated circuit and/or device.

FIG. 5 illustrates a non-limiting example of dynamic thermal management in a three-dimensional integrated circuit and/or device. In illustrating this technique, attention is focused on the heat removal path in a three-dimensional integrated circuit. Particularly, this technique reduces the temperatures of the individual device layers via improved vertical heat flow. This technique targets the obstacles in the vertical heat flow path from the source of the heating (e.g., device layer i) to the closest cooling solution and/or heat sink/spreader.

In the case that the device layers between the heated device layer and the thermal outlet are of varying temperatures and gradient patterns, the heat flow may be limited. To address this problem, however, the technique reduces the activity of these intermediate layers starting with the maximum temperature block (or layer) on the path. The maximum temperature layer/block on the heat removal path is the main obstacle to alleviating the hotspot problem. Hence, the idea here is to eliminate the heating problem of this layer/block (unit) first to gradually reduce the temperature of the target hotspot under consideration.

Regular temperature monitoring and checks with preset thresholds are performed (S510). At the initial stage of a heating problem, layer-based (or layer-specific) dynamic thermal management is activated, and as the temperature of the layer on the critical heat flow path is reduced, the thermal gradient is adjusted for a more effective heat removal (S520).

The layer-based DTM stays active for N iterations, and it is determined if the heating problem is solved through layer-based dynamic thermal management (S530). If the heating problem is solved through the use of local layer-based techniques, path-based thermal management is not activated, and the process continues regular temperature monitoring in operation S510.

Otherwise, if the heating problem is not solved, a cooling path(s) 'p' with the maximum heat flow from the hotspot to the heat sink/cooling solution is identified (S540). The hottest layers on the cooling path are cooled down (as long as they are above a predetermined threshold) to allow heat flow, and if the heating problem persists, the thermal management technique recursively cools all the layers on the critical heat flow path(s) and continues regular temperature monitoring in S510 (S550).

This technique may be used as an alternative to the previous methods, and/or in conjunction with the previous methods. This technique is also applicable to the cases where all the device layers are of disparate characteristics and it is not possible to migrate the computation.

Further, with respect to the N iterations in S530, in the case where there are multiple heat removal paths (such as multiple heat sinks or microchannels), the technique decides the best path to the cooling solution.

Additionally, with respect to S520, the layer based DTM is executed for N monitoring cycles (iterations) before the path-based scheme in S540 is activated.

A 'block' or 'unit' in this context relates to functional/logical units in the design and the granularity of thermal monitoring/management. Depending on the granularity at which thermal problems are managed, blocks may refer to parts of architectural units ranging from 'Floating Point Execution Units', 'Register Files', 'Controllers', etc. to larger processing units such as cores in a multi-core architecture. Indeed, the term block as used herein is not meant to be limiting.

One skilled in the art understands that the various thermal management techniques discussed herein may be employed in any case to address heat propagation when there is more than one-dimension. Such cases include multidimensional electronics, system-in-package technologies, 2.5 D integration technology, vertical stacks of servers in a datacenter, etc.

The capabilities of the present disclosure may be implemented in software, firmware, hardware, or some combination thereof.

As one example, one ore more features of the present disclosure can be included in an a article of manufacture (e.g., one or more computer program products) having, for instance, computer usable media. The media has embodied therein, for instance, computer readable program code means for providing and facilitating the capabilities of the present disclosure. The article of manufacture can be included as a part of a computer system or sold separately.

Additionally, at least one program storage device readable by a machine, tangibly embodying at least one program of instructions executable by the machine to perform the capabilities of the present disclosure can be provided.

The flow diagrams depicted herein are just examples. There may be many variations to these diagrams or the steps (or operations) described therein without departing from the spirit of the present disclosure. For instance, the steps may be performed in a differing order, or steps may be added, deleted or modified. All of these variations are considered a part of the claimed invention.

While exemplary embodiments have been described, it will be understood that those skilled in the art, both now and in the future, may make various improvements and enhancements which fall within the scope of the claims which follow. These claims should be construed to maintain the proper protection for the invention first described.

What is claimed is:

1. A method of dynamic thermal management in a multi-dimensional integrated circuit device, the method comprising:
    monitoring on-chip temperatures, on-chip power dissipation, and on-chip performance of device layers;
    comparing on-chip temperatures to thermal thresholds, on-chip power dissipation to power thresholds, and on-chip performance to performance thresholds;
    analyzing and utilizing interactions between temperatures of different device layers, different heat removal paths, power dissipation of different device layers, and performance of different device layers within the multi-dimensional integrated circuit device to manage temperatures; and
    activating layer-specific thermal and power management within performance constraints on one or more device layers through actuators in corresponding device layers, depending on heating severity.

2. The method of claim 1, wherein activating layer-specific thermal management via the actuators comprises at least one of:
    turning off part or all of one or more of individual device layers,
    dynamic voltage scaling part or all of one or more of the individual device layers,
    throttling activity on one or more of the individual device layers, and
    frequency scaling part or all of one or more of the individual device layers.

3. The method of claim 1, further comprising:
    identifying a hotspot region on one of the device layers of a chip;
    activating layer-specific dynamic thermal management for the device layer having the hotspot region;
    activating inverse thermal mapping on a device layer below the device layer having the hotspot region, such that a heating pattern of the device layer below complements a heating pattern of the device layer having the hotspot region;
    responsive to a determination that inverse thermal mapping on the device layer below the device layer having the hotspot region is not sufficient, activating inverse thermal mapping on a device layer above the device layer having the hotspot region, such that a heating pattern of the device layer above complements the heating pattern of the device layer having the hotspot region; and
    responsive to a determination that inverse mapping on the device layer above the device layer having the hotspot region is not sufficient, activating lateral inversion within the device layer having the hotspot region such that cooling of the hotspot region is expanded.

4. The method of claim 1, further comprising:
    identifying a hotspot region on one of the device layers of a chip;
    activating layer-specific dynamic thermal management for the device layer having the hotspot region;
    activating inter-layer dynamic thermal management for the device layers such that the device layers complement cooling of the hotspot region;
    responsive to a determination that inter-layer thermal dynamic management and layer-specific thermal management are not sufficient, increasing aggressiveness of the inter-layer thermal dynamic management and the layer-specific thermal management; and
    responsive to a determination that increasing the aggressiveness is not sufficient, extending dynamic thermal management up to a chip level.

5. The method of claim 1, further comprising:
    identifying a hotspot region on one of the device layers of a chip;
    activating layer-specific dynamic thermal management for the device layer having the hotspot region;
    responsive to a determination that layer-specific terminal dynamic management is not sufficient, clearing problems to heat flow in cooling paths to allow a maximum heat flow from the hotspot region to a heat sink.

6. The method of claim 3, wherein inverse thermal mapping comprises at least one of:
    causing an inverse heating pattern, as compared to a heating pattern of the hotspot region, on device layers contiguous to the device layer having the hotspot region, and
    providing cooler regions between hotspot regions in a checkerboard arrangement on one or more device layers.

* * * * *